United States Patent [19]
Johnson et al.

[11] Patent Number: 5,631,818
[45] Date of Patent: May 20, 1997

[54] POWER SUPPLY FOR ELECTROSTATIC PRECIPTATOR ELECTRODES

[75] Inventors: Nathaniel M. Johnson, Laconia; S. Edward Neister, New Durham, both of N.H.; Carl F. Butler, deceased, late of Redmond, Wash., AKA Fred C. Butler, by Margaret B. Butler, administratrix

[73] Assignee: Zero Emissions Technology Inc., New Durham, N.H.

[21] Appl. No.: 388,514

[22] Filed: Feb. 14, 1995

[51] Int. Cl.$^6$ .................................................. H02M 7/06
[52] U.S. Cl. ............................................ 363/126; 363/125
[58] Field of Search ................................ 363/125, 126, 363/128, 129, 84, 85, 135, 136, 67, 68

[56] References Cited

U.S. PATENT DOCUMENTS

| | | | |
|---|---|---|---|
| 2,999,970 | 9/1961 | Schwesig et al. | 321/27 |
| 3,648,437 | 3/1972 | Bridges | 55/105 |
| 3,772,853 | 11/1973 | Burge et al. | 55/105 |
| 3,824,444 | 7/1974 | Spink | 321/5 |
| 4,210,949 | 7/1980 | Masuda | 361/226 |
| 4,255,784 | 3/1981 | Rosa | 363/129 |
| 4,366,532 | 12/1982 | Rosa et al. | 363/69 |
| 4,482,945 | 11/1984 | Wolf et al. | 363/129 |
| 4,600,411 | 7/1986 | Santamaria | 55/139 |
| 4,787,023 | 11/1988 | Thomas | 363/54 |
| 4,996,471 | 2/1991 | Gallo | 323/241 |
| 5,225,815 | 7/1993 | Bocquet et al. | 340/645 |
| 5,267,137 | 11/1993 | Goebel | 363/87 |

FOREIGN PATENT DOCUMENTS

| | | |
|---|---|---|
| 549961 | 8/1956 | Belgium . |
| 249083 | 12/1987 | European Pat. Off. . |
| 477389 | 1/1938 | United Kingdom . |

*Primary Examiner*—Matthew V. Nguyen
*Attorney, Agent, or Firm*—Alfred J. Mangels

[57] ABSTRACT

A power supply system particularly adapted for use with an electrostatic precipitator to provide substantially ripple-free DC power for improved precipitator operation. The power supply is adapted to receive three-phase AC power and to transform the AC power into high voltage DC power having a minimum of voltage ripple in the output. The power supply includes a multi-phase transformer having three primary windings, each of the primary windings having associated with it a pair of secondary windings. The primary windings can be either delta connected or wye connected. One of each of the secondary windings associated with one of the respective primary windings are connected together in a delta connection arrangement, and the remaining secondary windings are connected in a wye connection arrangement. Because the respective AC voltage outputs of each of the secondary windings is out of phase with the AC voltage outputs of the other secondary windings, the resultant combined DC output voltage, after the DC voltages have been rectified in a three phase, full-wave bridge rectifier stack, which produces minimal ripple voltage and current, without requiring additional, more expensive, and less reliable components.

22 Claims, 2 Drawing Sheets

5,631,818

POWER SUPPLY FOR ELECTROSTATIC PRECIPTATOR ELECTRODES

BACKGROUND OF THE INVENTION

1. Field of the Invention

The present invention relates to electrical power supply apparatus for providing electrical power to operate particle-charging and particle collection electrodes of an electrostatic precipitator, by permitting the formation within the precipitator of an electrostatic field to electrically charge the particles to be collected and to collect the particles on the collection surfaces. More particularly, the present invention relates to an electrical power supply apparatus for converting the power provided by a three phase, alternating current power source to direct current power, in order to provide a more uniform DC voltage potential to the collection surfaces in an electrostatic precipitator for improved particle collection and improved precipitator operation.

2. Description of the Related Art

Electrostatic precipitators have taken on considerably greater importance in recent years, particularly in view of the increased emphasis upon maintaining a clean environment. That increased emphasis includes air pollution control by maintaining clean exhausts from industrial processes that involve the combustion or other form of transformation of materials, and that result in the generation of particulate matter as a consequence of carrying out the process. The techniques and structural elements incorporated in modern electrostatic precipitators, particularly the electrical control apparatus for controlling the power provided for charging the particulate matter to be collected, as well as the power provided to the collection surfaces, have been continually refined to more completely remove particulates from stack gases, such as from chemical process exhaust gases and from fossil fuel electric generating plant exhaust gases, and also to provide longer useful operating life for the precipitator components.

The theory behind the operation of an electrostatic precipitator involves the generation of a strong electrical field through which stack gases pass, so that the particles carried by the stack gases can be electrically charged. By charging the particles electrically they can be separated from the gas stream and collected, and thereby not enter and pollute the atmosphere. The generation of such electrical fields requires electrical power supplies that can provide a high DC voltage to charge the particulate matter and thereby permit its collection. The existing systems are based upon AC corona theory, using a single phase transformer-rectifier set to rectify AC power to DC power and provide a high DC potential between a charging electrode, to charge the particles, and a collection surface, usually a plate, so that the stack gases are subjected to the maximum current obtainable through the gas without complete breakdown. That approach is believed to produce the maximum ionization of the particles and thereby the maximum efficiency in effecting removal of such particles.

Heretofore, the emphasis in particulate removal was placed on increasing the current flow between a grid and a plate defining the electrostatic precipitator collection surfaces, to a current level that produced a maximum of sparking between the grid and the plate. In fact, some precipitators incorporated a grid structure that contains barbed wire or special pointed rods, specifically to enhance such sparking. The sparking inside a precipitator is believed to be necessary as an indicator that the maximum possible current is being drawn, and therefore the maximum possible ionization of the gases and particles is taking place. The practice of encouraging sparking is emphasized, even though it is known that sparking produces stresses upon the electrical components of the system, and it also causes increased precipitator maintenance because of the production of agglomerated particles, sometimes called, "ash balls" or "klinkers," and also causes difficulty in insuring that the "rappers," which are devices that vibrate the precipitator plates to remove collected particles, are, in fact, operative and are removing collected particulate material.

Part of the problem that results from operating a precipitator at a level at which sparking occurs is that the automatic controller for the transformer-rectifier set must sense an arc and immediately reduce the voltage on the precipitator collector plate, because any spark can quickly create an arc between the plate and the electrode, with a resultant high current flow. The high current flow can cause severe damage to the precipitator grid or plate, it can cause the transformer-rectifier set to fail, it can cause the controller to fail, or it can open the overcurrent protectors that are provided in the incoming power line. Any of those incidents will cause a section of the precipitator to be temporarily off-line, with resultant passing of the particulates into the atmosphere until the failures have been repaired. Repair can be a matter of minutes, or it can be weeks if the transformer-rectifier set or controller has to be replaced.

Transformer-rectifier sets in most prevalent use are operated based upon single-phase alternating current as the power source. However, a single phase source does not produce the most steady high voltage field for efficiently collecting particulates. Additionally, the voltage control apparatus for such a transformer-rectifier set must be quite sophisticated to prevent component failures, it requires a high level of maintenance on the grid works, and, because it introduces inefficiencies, the control apparatus involves a higher consumption of electrical power than would otherwise be necessary. The high power consumption requires larger, more expensive transformer-rectifier sets, which thereby increases the initial capital cost to the owner or operator of the process equipment.

It is an object of the present invention to provide an improved high-voltage power supply for electrostatic precipitators to overcome the shortcomings of the previous devices.

It is a further object of the present invention to provide a power supply for electrostatic precipitators that results in a substantially uniform output voltage, with a minimum of voltage fluctuation or ripple.

SUMMARY OF THE INVENTION

Briefly stated, in accordance with one aspect of the present invention, a high voltage power supply is provided, particularly for use in an electrostatic precipitator. The power supply receives three-phase AC power that is provided through the primary side of a three-phase transformer that includes three primary windings and six secondary windings, two secondary windings for each of the primary windings. The outputs of the respective secondary windings are combined through a bridge rectifier stack to provide a substantially smooth DC voltage output. A microprocessor based, multi-port controller can be provided to respond to the output current and output voltage from the rectifier stack to provide appropriate control signals for an input voltage controller and for a switching arrangement for controlling the power from the power source.

In accordance with another aspect of the present invention, a transformer structure adapted for providing substantially smooth DC voltage output is provided, and is particularly adapted for use in an electrostatic precipitator. The transformer receives power from a three-phase AC power source and includes three primary windings that can be interconnected in either a delta or a wye arrangement. Each primary winding is operatively associated with a pair of secondary windings, wherein one secondary winding of each pair is connected with one of each of the other secondary windings in a delta configuration, and the remaining secondary windings are connected together in a wye configuration. The twelve AC voltage outputs from the secondary windings are operatively connected with an array of 12 rectifiers defining a full-wave bridge rectifier stack to provide a combined DC voltage output wherein the average voltage level substantially coincides with the maximum voltage level, to provide a substantially ripple-free voltage output.

DESCRIPTION OF THE PREFERRED EMBODIMENTS

Figure 1:
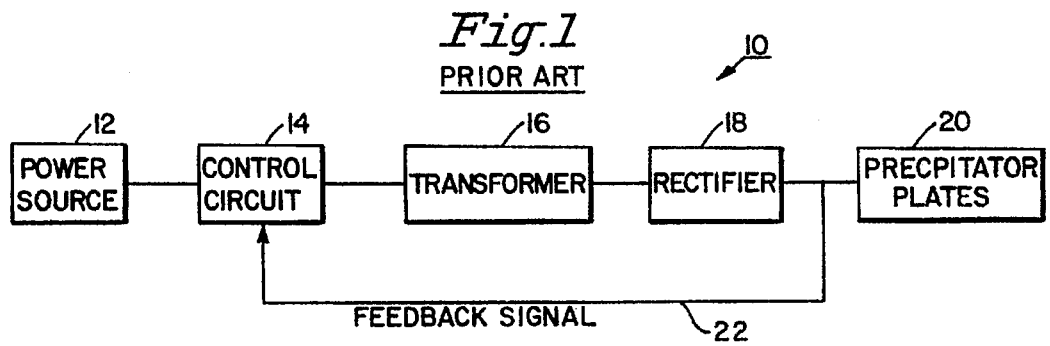
FIG. 1 is a block diagram showing the general form of a prior art power supply system that can be employed in an electrostatic precipitator.

Referring now to the drawings, and particularly to FIG. 1 thereof, there is shown in block diagram form the arrangement of the several elements constituting a basic, prior art power supply 10 for an electrostatic precipitator. The power supply shown transforms alternating current from a single phase, AC power source 12 into direct current. AC power source 12 is connected with the input terminals of a control circuit 14, the output of which is connected with the primary winding terminals of a power transformer 16, which either steps up the AC voltage, or steps down the AC voltage, depending upon the number of turns of wire defining each of the primary and secondary windings of transformer 16. For an electrostatic precipitator power supply arrangement transformer 16 is configured as a step up transformer that provides a larger output or secondary voltage than the input or primary voltage.

The output of transformer 16 is provided at the input of a rectifier 18, which can be either a half-wave rectifier or a full-wave rectifier. Rectifier 18 serves to eliminate the negative going portion of the voltage waveform at the output of transformer 16, and to convert the alternating current output at the secondary of transformer 16 to direct current. The output from rectifier 18 is essentially pulsating, non-steady-state DC power, and is provided to input terminals at the plate portion 20 of an electrostatic precipitator. Present practice in the electrostatic precipitator field does not utilize any post-rectification filtering of the waveform before it is applied to the precipitator plates. Instead, the AC corona discharge theory on which present practice is based contemplates that ripple voltage is necessary to provide the best operation for removing the fly ash.

Control circuit 14 receives as an input a rectifier output current or voltage 22, usually represented as the voltage across a series resistor (not shown) positioned on the output side of rectifier 18, or as the output current from rectifier 18. Control circuit 14 is adapted to sense the currents and voltages on the output or secondary side of transformer 16, and to provide a suitable control signal to limit the power to the primary side of transformer 16 should the transformer secondary voltage or current exceed a predetermined value, such as when arcing occurs within the precipitator, to limit transformer primary voltage and thereby prevent damage to the transformer and rectifier.

Figure 2:
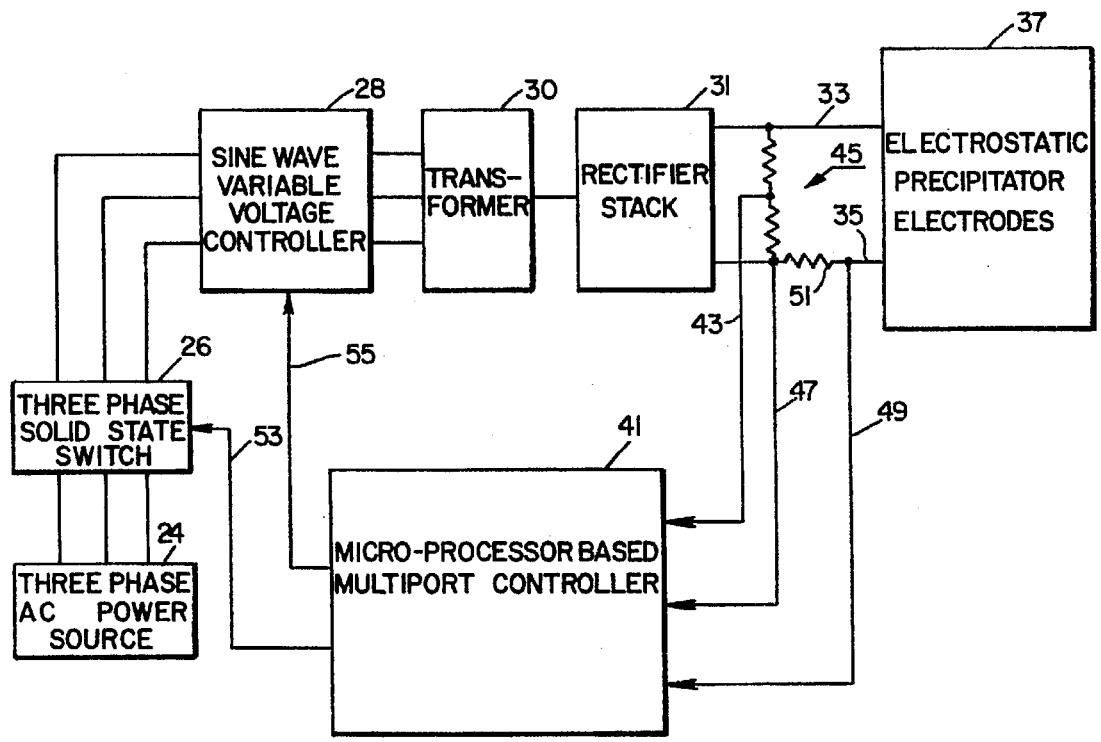
FIG. 2 is a block diagram, partially in schematic form, showing a power supply system in accordance with the present invention for providing from an AC input power source smooth, substantially ripple-free DC output power for operating the particle charging and particle collection surfaces of an electrostatic precipitator.

The corresponding block diagram for a power supply circuit in accordance with the present invention is shown in FIG. 2. The present invention contemplates a power source 24 to provide three-phase AC power, the respective phases of which are connected with a three-phase, solid state switch 26. The switch can be a commercially available type well known to those skilled in the art. The precise model of switch that can be provided in a given system is dependent upon the power rating and other operating parameters of the circuit. In that regard, a solid state switch is preferred from the standpoint of switching speed, because such a switch can be switched off in ½ power cycle or less. Fast switching provides the benefit of reduced damage to electronic parts in the power supply circuit and also in the transformer/rectifier set. However, if fast switching is not critical for protection of downstream circuit elements a standard three pole motor contactor can be employed.

A sine wave, variable voltage controller 28 of a type well known to those skilled in the art is connected between switch 26 and a transformer 30 to control the input voltage to the primary windings of transformer 30, which thereby also controls the transformer output voltage provided by the transformer secondary windings. Transformer 30 is adapted to receive three-phase AC power from voltage controller 28 and to provide as output a plurality of stepped-up AC voltages that are provided to a rectifier stack 31 to convert the several transformer output voltages from AC to a single, DC voltage. The DC power output from rectifier stack 31 is passed through power conductors 33 and 35 to electrostatic precipitator electrodes 37.

Additionally, a controller 41 is provided between the output of rectifier bank 32 and each of switch 32 and controller 28. Controller 41 is adapted to receive along line 43 from a voltage divider 45 an input signal representative of the output voltage from rectifier stack 32, and along lines 47 and 49 from respective ends of a resistor 51 input signals representative of rectifier output current. Controller 41 provides as output a pair of control signals along lines 53 and 55 based upon those input signals for controlling the operation of each of solid state switch 26 and of voltage controller 28, respectively.

As shown in FIG. 2, controller 41 receives signals along lines 43, 47, and 49 indicative of the operating condition of precipitator electrodes 38 by detecting the rectified DC output voltage and current drawn by precipitator electrodes 38. If the voltage to precipitator electrodes 38 is above a predetermined value, an output signal is provided along line 55 to sine wave variable voltage controller 28 to reduce the transformer input voltage level. Similarly, rectifier output current as drawn by precipitator electrodes 38 is detected by signals provided to controller 41 along lines 47 and 49, and controller 41 provides an output signal along line 49 to control the operation of solid state switch 26, and also an appropriate signal to shut down the system in the event of excessive current draw. Controller 41 is preferably a microprocessor-based controller, and a suitable controller of that type is available as model No. IPS-101, available from SHL Design Corp.

A commercially available opacity monitor (not shown) of any known type can optionally be provided as a part of an electrostatic precipitator control system to detect and monitor the opacity of the stack exhaust gases. The opacity monitor permits an assessment of the effectiveness of particulate separation by the precipitator, and it preferably provides either an aural or a visual output signal to indicate the opacity level or, alternatively, to indicate when the opacity exceeds a predetermined level.

Figure 3:
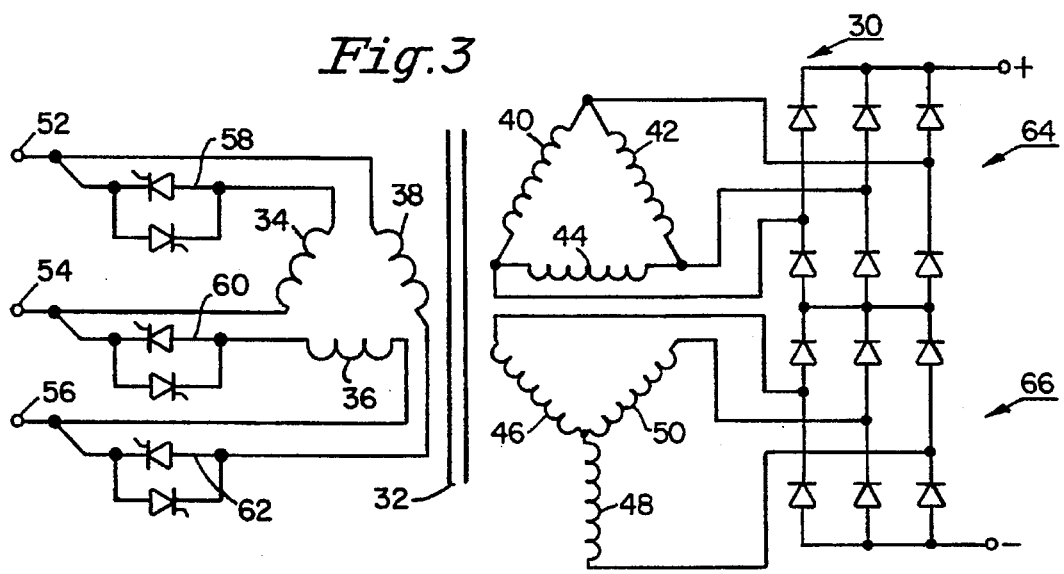
FIG. 3 is a schematic diagram showing the electrical arrangement of one form of high-voltage transformer in accordance with the present invention for transforming three-phase AC voltage into substantially ripple-free DC voltage.

A preferred form of transformer 30 in accordance with the present invention for use in a power supply for an electrostatic precipitator, such as the power supply shown in block diagram form in FIG. 2, is illustrated schematically in FIG. 3. Transformer 30 is a step-up transformer, and it includes a conventional, preferably laminated, iron core 32, three primary windings 34, 36, and 38, and six secondary windings 40 through 50. Although disclosed in the context of an iron core, if the input source provides high frequency, three-phase power a ceramic core can alternatively be employed.

Each primary winding has associated with it a pair of secondary windings, the latter of which provide as outputs a plurality of phase-displaced, stepped-up, AC voltage outputs. Specifically, primary winding 34 has associated with it secondary windings 40 and 46, primary winding 36 has associated with it secondary windings 42 and 48, and primary winding 38 has associated with it secondary windings 44 and 50. As shown in FIG. 3, primary windings 34, 36, and 38 are connected in a delta connection arrangement, secondary windings 40, 42, and 44 are also connected in a delta connection arrangement, and secondary windings 46, 48, and 50 are connected in a wye connection arrangement.

Transformer 30 preferably includes a grounded electrostatic shield (not shown) to block undesirable electrical noise emitted by transformer 30 from affecting adjacent electrical devices. A suitable shield can be a standard copper foil shield that includes one isolated turn of foil, having the same width as the primary winding, and installed in overlying relationship with the primary winding. A lead from the foil shield extends either to the core or to the frame of the transformer to drain off any common mode signals that may be present The shield also prevents unwanted high frequency signals from being transferred between the primary and secondary windings, thereby substantially reducing potential interference with the low level signals used in the electronic controller.

Preferably, the windings of transformer 30 are arranged on the core in a configuration that provides a higher impedance to the load than would normally be provided. The higher impedance results from increasing the spacing between the primary and secondary coils, and also from winding the secondary coils side-by-side, instead of one above the other as is conventional, for the purpose of reducing leakage reactance and thereby reducing the effective impedance of the transformer output. The increased impedance provides a "soft" output voltage that automatically decreases whenever the precipitator sparks or arcs over. The resulting decrease in voltage limits the energy in the arc and thereby reduces the possibility of damage to the precipitator, while simultaneously reducing the production of ozone. Moreover, the high impedance within the transformer also serves to limit the output current to the precipitator, thereby also limiting the current drawn through the rectifier stacks. Limiting the rectifier current draw protects the rectifiers from failure from instantaneous overcurrent. The built-in, increased impedance of the transformer in accordance with the present invention also operates to limit the instantaneous high currents that would otherwise be reflected to the primary windings, thereby protecting the primary power controller and other electronic components from burning out from excessive current.

As shown in FIG. 3 the three individual primary windings 34, 36, and 38 are connected together in a delta configuration to define the interconnected transformer primary section. Each of the nodes 52, 54, and 56 of the delta-configured primary windings is electrically connected with a respective transformer power input terminal. Between each primary winding and the nodes 52, 54, and 56 is a reverse blocking, triode-type, P-type gate thyristor 58, 60, and 62, respectively, that is defined by a pair of SCR's, each having a gate to receive a current pulse for the purpose of turning on the respective thyristors.

The six secondary windings are connected together in two groups of three windings each, and each of a pair of the secondary windings is associated with one of the primary windings. Secondary windings 40, 42, and 44 are connected together in a delta-type connection and secondary windings 46, 48, and 50 are connected together in a wye-type connection. One of each of the wye and delta-connected secondary windings is associated with one of the primary windings. As will be apparent to those skilled in the art, the output voltages generated in the respective secondary windings are phase-displaced from each other by 120° in each of the delta and wye secondary loops. Additionally, the delta and wye outputs are phase displaced from each other by 60°, so that the respective output terminals provide 6 output voltages that are phase displaced from each other.

Each of the three phase AC output voltages from each of the interconnected delta and wye secondary windings of the transformer is converted to DC in a pair of rectifier arrays 64 and 66. Each rectifier array 64, 66 is a full-wave, three phase rectifier bridge that includes six semiconductor diodes that are driven by the transformer secondary voltages provided by the delta and wye secondary windings, respectively. Rectifier arrays 64 and 66 are connected in series to define a rectifier stack, and the combined outputs from the series-connected rectifier arrays provide the source of DC voltage for the electrostatic precipitator electrodes.

The rectifier stack illustrated in FIG. 3 includes 12 individual, high voltage semiconductor diode assemblies. Each diode assembly is formed by individual diode junctions in series, properly compensated so that the assembly is rated to withstand several times the high inverse voltage present in the system. The compensation is provided to ensure that the reverse voltage appearing across the assembly is equally shared by each of the individual diode junctions, and the assemblies can be so packaged to permit as few as two packages that contain the total of 12 high voltage diodes. It will be apparent to those skilled in the art that more or fewer diodes can be provided, depending upon the output voltage desired, based upon the particular electrostatic precipitator system involved.

In operation, an operator initially sets the desired voltage and current levels based upon previous experience data. On initialization of the system, the rectifier voltage output starts from zero and ramp up to the final, desired voltage setting. Output voltage is limited automatically as a result of rectifier output current exceeding the preset maximum current setting, or spark sense integrator module sensing incipient sparking over, or rectifier output voltage exceeding the preset maximum voltage setting. When steady-state operation is achieved, output voltage is automatically varied, such as sensing by a stack gas opacity detector, or based upon rectifier output current or rectifier output voltage. The output voltage preferably will also vary based upon any changes in the sparking characteristics of the flue gases because of changes in the gas chemistry, the moisture content, the gas temperature, and the like.

In the event of severe sparking, or a direct short circuit at the rectifier output, the short circuit sense module causes the controller to shut down the power supply immediately (within 2 milliseconds or less), to reduce the output voltage level to prevent a short circuit arc. That may or may not result in the voltage going to zero. The purpose of reducing the voltage as soon as possible is to quench the arc by reducing the power that would be necessary to sustain the arc. Long duration arcing, longer than ten cycles or 160 milliseconds, typically require up to ten times the current that would normally be produced by the transformer-rectifier set. That level would cause damage either to the rectifiers, to the transformer, or to the electrodes or other components within the electrostatic precipitator. Restart is automatic with the rectifier output voltage being ramped up as in an initial startup condition. Optionally, a fault recorder (not shown) of known construction can be provided to time the fault, and if a second shutdown occurs within a predetermined time interval, the controller can shut down the power supply, activate an alarm, and require manual override in order to again commence operation. In the event of severe sparking, the rectifier output voltage can be reduced by the controller to a level at which sparking is reduced, as a result of which controller 40 can reduce the voltage at the output of voltage controller 28, which will, in turn, reduce the field intensity and the tendency to spark.

The present system as herein disclosed is fully balanced without the need for sophisticated and complicated sequencing circuits or phase shift balancing circuits normally required in three phase systems. Feedback is by level detection only, and is not dependent upon the typical phase/gain relationship upon which conventional feedback controlled power supply systems are based.

Because of the out-of-phase relationship of the several AC voltages provided by the secondary windings, the resulting output voltage has extremely little ripple, and consequently control of the electrostatic precipitator is simplified. In fact, it has been found that the ripple in the output voltage from the preferred transformer construction as herein described is less than 1%. And the frequency of the ripple voltage is 12 times the frequency of the AC source (720 Hz. for a 60 Hz. AC source frequency).

Additionally, the likelihood of sparking is minimized without the need for additional electrical filtering by reducing the magnitude of any alternating frequency component in the voltage (and current). Because the dielectric strength of fly ash, as well as of other stack materials, is frequency dependent, pure DC voltage will not cause sparks until a significantly higher voltage level is reached than the voltage level at which sparking begins to occur when voltage having significant ripple, or an AC component, is provided to the precipitator electrodes. Consequently, removing the ripple and providing a nearly pure DC voltage operates to effectively increase the dielectric strength of the fly ash, which results in higher operating voltages on the grid and plate electrostatic precipitator collection surfaces, producing a resultant increase in the efficiency of particle collection.

When the structural elements of the present invention are provided, the increased and more uniform electrical field provided by the precipitator electrodes reduces the amount of power that must be applied, it simplifies the controls that are needed, and it thereby provides significant cost savings because of the reduction in the power requirement and the reduction in maintenance that would otherwise be required because of the sparking that occurs in the prior art precipitators. The reduction of sparking and arcing inside the electrostatic precipitator reduces the amount of ultraviolet light that is produced. Reducing that source of intense ultraviolet light will also produce a concomitant reduction in ozone that is produced then ultraviolet light breaks the gaseous oxygen's covalent bond.

Figure 4:
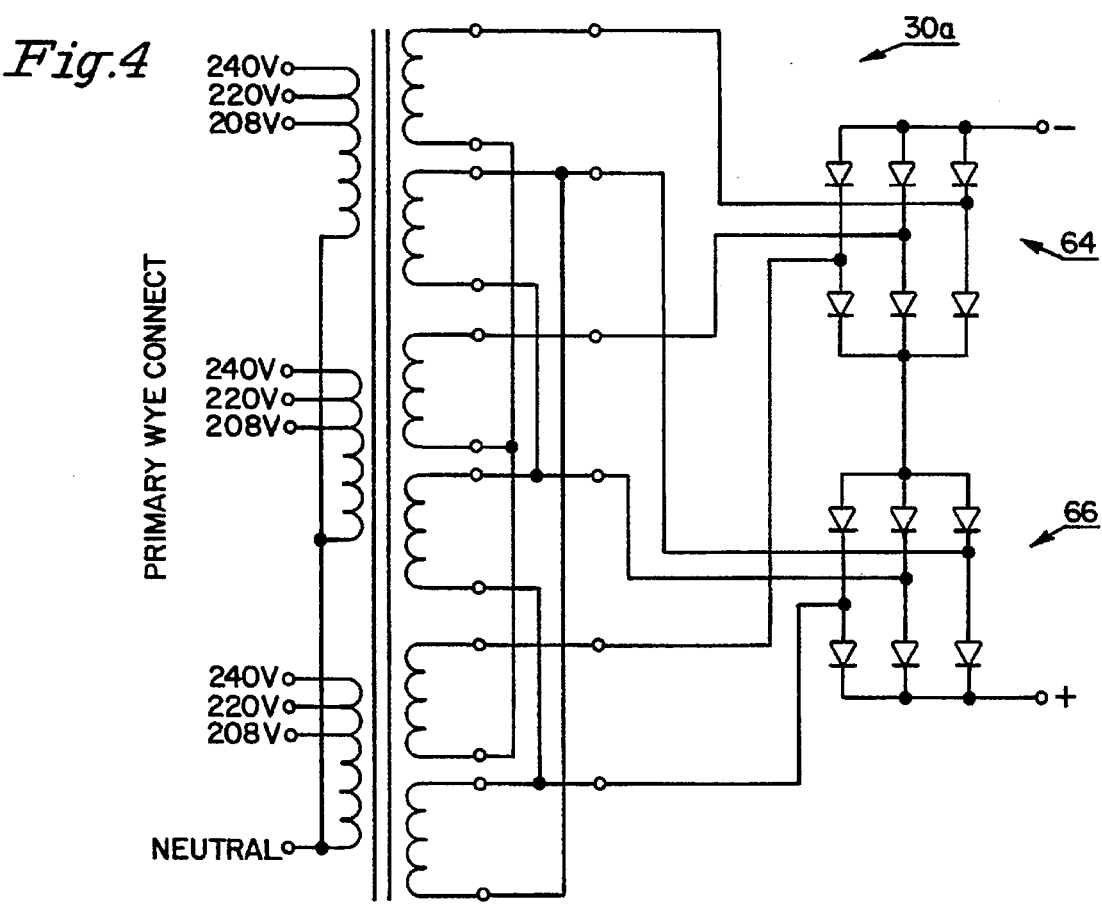
FIG. 4 is a schematic electrical diagram similar to that of FIG. 3 but showing an alternative embodiment of a transformer in accordance with the present invention for transforming three-phase AC voltage into substantially ripple-free DC voltage.

Although shown in FIG. 3 as connected in a delta configuration, the primary windings of the transformer in accordance with the present invention can also be connected in a wye connection arrangement, as illustrated in the schematic diagram of FIG. 4. In all other respects, the structure of the transformer 30a and the rectifier arrays 64 and 66 shown in FIG. 4 are the same as those shown in FIG. 3. Again, the combined AC voltage outputs of the secondary windings of transformer 30a, after passage through the rectifier arrays, provide a significantly smoother DC voltage output. That smoother output voltage is obtained without the need for additional electrical filtration of the transformer output, as contrasted with outputs from single-phase transformers of the type that are now common in the electrostatic precipitator field.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A power supply for providing a substantially ripple-free DC voltage to the electrodes of an electrostatic precipitator from a three phase AC power source, said power supply comprising:

a. a three-phase power transformer having three primary windings adapted to be electrically connected with a source of three phase AC power and having six secondary windings, wherein a pair of two secondary windings is associated with a respective one of each of the three primary windings to provide from the secondary windings a plurality of phase displaced AC voltage outputs;

b. a first three-phase, full-wave rectifier array connected with output terminals of a first group of interconnected secondary windings that include a first secondary winding associated with a respective one of each of the primary windings, and a second three-phase, full-wave rectifier array connected with output terminals of a second group of interconnected secondary windings that include a second secondary winding associated with a respective one of each of the primary windings, wherein the first and second rectifier arrays are connected in series to define a rectifier stack that includes a pair of output terminals to provide a substantially ripple-free DC output voltage; and c. a pair of electrostatic precipitator electrodes connected with respective ones of the rectifier stack output terminals for charging and collecting particulates that pass adjacent the electrodes.

2. A power supply in accordance with claim 1 wherein the primary windings are connected in a delta connection arrangement.

3. A power supply in accordance with claim 2 wherein the primary windings are on a unitary core.

4. A power supply in accordance with claim 1 wherein the primary windings are connected in a wye connection arrangement.

5. A power supply in accordance with claim 4 wherein the primary windings are on a unitary core.

6. A power supply in accordance with claim 1 wherein the transformer secondary windings associated with a respective primary winding are positioned in side-by-side relationship to each other.

7. A power supply in accordance with claim 2 wherein the transformer secondary windings associated with a respective primary winding are positioned in side-by-side relationship to each other.

8. A power supply in accordance with claim 4 wherein the transformer secondary windings associated with a respective primary winding are positioned in side-by-side relationship to each other.

9. A power transformer for transforming a three-phase AC voltage into a substantially ripple-free DC output voltage for providing power to an electrostatic precipitator, said transformer comprising:
   a. three primary windings each positioned on a core, each primary winding connected with at least one of the three phase input lines;
   b. a pair of secondary windings associated with respective ones of each of the primary windings, wherein one set of three secondary windings including one secondary winding associated with each of the primary windings is connected in a delta connection arrangement and the remaining set of three secondary windings including another secondary winding associated with respective ones of each of the primary windings is connected in a wye connection arrangement, and wherein the wye connection arrangement is connected in series with the delta connection arrangement;
   c. a rectifier array connected with output terminals of each of the wye connection arrangement and the delta connection arrangement to provide a substantially ripple-free DC power output from the transformer secondary windings at a pair of rectifier array output terminals; and
   d. wherein the rectifier array output terminals are coupled with a pair of electrostatic precipitator electrodes.

10. A power transformer in accordance with claim 9 wherein the primary windings are connected in a delta connection arrangement.

11. A power transformer in accordance with claim 10 wherein the primary windings are on a unitary core.

12. A power transformer in accordance with claim 9 wherein the primary windings are connected in a wye connection arrangement.

13. A power transformer accordance with claim 12 wherein the primary windings are on a unitary core.

14. A power transformer in accordance with claim 9 wherein the primary windings are positioned in side-by-side relationship to each other on the core.

15. A power transformer in accordance with claim 14 wherein the primary windings are connected in a delta connection arrangement.

16. A power transformer in accordance with claim 15 wherein the primary windings are on a unitary core.

17. A power transformer in accordance with claim 14 wherein the primary windings are connected in a wye connection arrangement.

18. A power transformer in accordance with claim 17 wherein the primary windings are on a unitary core.

19. A power transformer in accordance with claim 9 including a pair of full-wave bridge rectifier arrays, one array connected with output terminals of the secondary windings connected in delta and one array connected with output terminals of the secondary winding connected in wye.

20. A power transformer in accordance with claim 19 wherein the pair of rectifier arrays are connected in series to define a rectifier stack that includes a pair of output terminals to provide a substantially ripple-free DC output voltage.

21. A power supply in accordance with claim 1 wherein the windings of each pair of secondary windings are positioned in side-by-side relationship to provide a high impedance secondary winding for limiting transformer output currents.

22. A power transformer in accordance with claim 9 wherein the windings of each pair of secondary windings are positioned in side-by-side relationship to provide a high impedance secondary winding for limiting transformer output currents.

* * * * *